(12) United States Patent
Roesch et al.

(10) Patent No.: US 7,948,988 B2
(45) Date of Patent: May 24, 2011

(54) DEVICE, SYSTEM AND METHOD FOR ANALYSIS OF FRAGMENTS IN A FRAGMENT TRAIN

(75) Inventors: Martin Frederick Roesch, Eldersburg, MD (US); Judy Hollis Novak, Marriotsville, MD (US); Steven Sturges, Ellicott City, MD (US)

(73) Assignee: Sourcefire, Inc., Columbia, MD (US)

( * ) Notice: Subject to any disclaimer, the term of this patent is extended or adjusted under 35 U.S.C. 154(b) by 880 days.

(21) Appl. No.: 11/493,934

(22) Filed: Jul. 27, 2006

(65) Prior Publication Data

US 2008/0127342 A1    May 29, 2008

(51) Int. Cl.
    H04L 12/28    (2006.01)
(52) U.S. Cl. .......................... 370/394; 395/200
(58) Field of Classification Search .............. 370/474, 370/395.21, 394; 709/236, 230
    See application file for complete search history.

(56) References Cited

U.S. PATENT DOCUMENTS

| | | | |
|---|---|---|---|
| 4,550,436 A | 10/1985 | Freeman | |
| 4,570,157 A | 2/1986 | Kodaira | |
| 4,857,912 A | 8/1989 | Everett et al. | |
| 4,912,748 A | 3/1990 | Horii et al. | |
| 4,985,863 A | 1/1991 | Fujisawa et al. | |
| 5,193,192 A | 3/1993 | Seberger | |
| 5,222,081 A | 6/1993 | Lewis et al. | |
| 5,404,488 A | 4/1995 | Kerrigan et al. | |
| 5,430,842 A * | 7/1995 | Thompson et al. | 709/236 |
| 5,459,841 A | 10/1995 | Flora-Holmquist et al. | |
| 5,495,409 A | 2/1996 | Kanno | |
| 5,497,463 A | 3/1996 | Stein et al. | |
| 5,604,910 A | 2/1997 | Kojima et al. | |
| 5,666,293 A | 9/1997 | Metz et al. | |
| 5,796,942 A | 8/1998 | Esbensen | |
| 5,870,554 A | 2/1999 | Grossman et al. | |
| 5,901,307 A | 5/1999 | Potter et al. | 712/240 |
| 5,917,821 A | 6/1999 | Gobuyan et al. | |
| 5,919,257 A | 7/1999 | Trostle | |
| 5,963,942 A | 10/1999 | Igata | |
| 5,987,473 A | 11/1999 | Jorgensen | |
| 5,995,963 A | 11/1999 | Nanba et al. | |
| 5,999,937 A | 12/1999 | Ellard | |
| 6,002,427 A | 12/1999 | Kipust | |
| 6,141,686 A | 10/2000 | Jackowski et al. | |
| 6,199,181 B1 | 3/2001 | Rechef et al. | |
| 6,219,786 B1 | 4/2001 | Cunningham et al. | |
| 6,320,848 B1 | 11/2001 | Edwards et al. | |
| 6,321,338 B1 | 11/2001 | Porras et al. | |

(Continued)

OTHER PUBLICATIONS

Office Action issued by the U.S. Patent Office on Oct. 6, 2008 in connection with related U.S. Appl. No. 10/843,374.

(Continued)

*Primary Examiner* — Dang T Ton
*Assistant Examiner* — Wei Zhao
(74) *Attorney, Agent, or Firm* — Posz Law Group, PLC

(57) ABSTRACT

Fragment trains in a communication network are analyzed. A fragment train includes fragments in the same fragment train and associated with the same target system. One or more fragment reassembly policies are identified out of several fragment reassembly policies, where the fragment reassembly policy corresponds to a target system associated with fragments in a fragment train. The data in the fragments in the fragment train are provided in an order indicated by the fragment reassembly policy. The fragment reassembly policy can include determining the order responsive to an offset and a more fragments indication in the fragments, and/or indicating an order specific to overlapped fragments such as comprehensively overlapped fragments.

21 Claims, 8 Drawing Sheets

U.S. PATENT DOCUMENTS

| | | |
|---|---|---|
| 6,324,656 B1 | 11/2001 | Gleichauf et al. |
| 6,334,121 B1 | 12/2001 | Primeaux et al. |
| 6,343,362 B1 | 1/2002 | Ptacek et al. |
| 6,393,474 B1 | 5/2002 | Eichert et al. |
| 6,415,321 B1 | 7/2002 | Gleichauf et al. |
| 6,477,648 B1 | 11/2002 | Schell et al. |
| 6,487,666 B1 | 11/2002 | Shanklin et al. |
| 6,499,107 B1 | 12/2002 | Gleichauf et al. |
| 6,539,381 B1 | 3/2003 | Prasad et al. |
| 6,546,493 B1 | 4/2003 | Magdych et al. |
| 6,587,876 B1 | 7/2003 | Mahon et al. |
| 6,590,885 B1 | 7/2003 | Jorgensen |
| 6,678,734 B1 | 1/2004 | Haatainen et al. |
| 6,678,824 B1 | 1/2004 | Cannon et al. |
| 6,684,332 B1 | 1/2004 | Douglas |
| 6,711,127 B1 | 3/2004 | Gorman et al. |
| 6,754,826 B1 | 6/2004 | Challenger et al. |
| 6,766,320 B1 * | 7/2004 | Wang et al. .......... 707/5 |
| 6,772,196 B1 | 8/2004 | Kirsch et al. |
| 6,789,202 B1 | 9/2004 | Ko et al. |
| 6,851,061 B1 | 2/2005 | Holland et al. |
| 6,957,348 B1 | 10/2005 | Flowers et al. |
| 6,983,323 B2 | 1/2006 | Cantrell et al. |
| 6,993,706 B2 | 1/2006 | Cook |
| 6,999,998 B2 | 2/2006 | Russell |
| 7,032,114 B1 | 4/2006 | Moran .......... 713/187 |
| 7,054,930 B1 | 5/2006 | Cheriton |
| 7,058,821 B1 * | 6/2006 | Parekh et al. .......... 713/194 |
| 7,065,657 B1 | 6/2006 | Moran |
| 7,073,198 B1 | 7/2006 | Flowers et al. .......... 726/25 |
| 7,076,803 B2 | 7/2006 | Bruton et al. |
| 7,096,503 B1 | 8/2006 | Magdych et al. |
| 7,113,789 B1 | 9/2006 | Boehmke |
| 7,133,916 B2 | 11/2006 | Schunemann |
| 7,134,141 B2 | 11/2006 | Crosbie et al. |
| 7,152,105 B2 | 12/2006 | McClure et al. .......... 709/224 |
| 7,174,566 B2 | 2/2007 | Yadav |
| 7,181,769 B1 | 2/2007 | Keanini et al. |
| 7,257,630 B2 | 8/2007 | Cole et al. .......... 709/224 |
| 7,305,708 B2 | 12/2007 | Norton et al. |
| 7,310,688 B1 | 12/2007 | Chin .......... 709/252 |
| 7,313,695 B2 | 12/2007 | Norton et al. |
| 7,315,801 B1 | 1/2008 | Dowd et al. |
| 7,317,693 B1 | 1/2008 | Roesch et al. |
| 7,350,077 B2 | 3/2008 | Meier et al. |
| 7,363,656 B2 | 4/2008 | Weber et al. |
| 7,596,807 B2 | 9/2009 | Ptacek et al. |
| 7,644,275 B2 | 1/2010 | Mowers et al. |
| 2001/0027485 A1 | 10/2001 | Ogishi et al. |
| 2001/0034847 A1 | 10/2001 | Gaul, Jr. |
| 2002/0035639 A1 | 3/2002 | Xu |
| 2002/0066034 A1 | 5/2002 | Schlossberg |
| 2002/0083344 A1 | 6/2002 | Vairavan |
| 2002/0087716 A1 * | 7/2002 | Mustafa .......... 709/236 |
| 2002/0112185 A1 | 8/2002 | Hodges |
| 2002/0123995 A1 | 9/2002 | Shibuya |
| 2002/0165707 A1 | 11/2002 | Call |
| 2003/0009699 A1 | 1/2003 | Gupta et al. |
| 2003/0014662 A1 | 1/2003 | Gupta et al. |
| 2003/0046388 A1 | 3/2003 | Milliken |
| 2003/0065817 A1 | 4/2003 | Benchetrit et al. |
| 2003/0083847 A1 | 5/2003 | Schertz et al. |
| 2003/0093517 A1 | 5/2003 | Tarquini |
| 2003/0101353 A1 | 5/2003 | Tarquini et al. .......... 713/200 |
| 2003/0140250 A1 | 7/2003 | Taninaka et al. |
| 2003/0195874 A1 | 10/2003 | Akaboshi |
| 2003/0212910 A1 | 11/2003 | Rowland et al. |
| 2003/0217283 A1 | 11/2003 | Hrastar et al. |
| 2003/0229726 A1 | 12/2003 | Daseke et al. |
| 2004/0010684 A1 | 1/2004 | Douglas |
| 2004/0015728 A1 | 1/2004 | Cole et al. |
| 2004/0034773 A1 | 2/2004 | Balabine et al. |
| 2004/0064726 A1 | 4/2004 | Girouard |
| 2004/0073800 A1 | 4/2004 | Shah et al. |
| 2004/0093582 A1 | 5/2004 | Segura |
| 2004/0098618 A1 | 5/2004 | Kim et al. |
| 2004/0123153 A1 | 6/2004 | Wright et al. |
| 2004/0172234 A1 | 9/2004 | Dapp et al. |
| 2004/0179477 A1 | 9/2004 | Lincoln et al. |
| 2004/0193943 A1 | 9/2004 | Angelino et al. |
| 2004/0210756 A1 | 10/2004 | Mowers et al. |
| 2004/0218532 A1 | 11/2004 | Khirman |
| 2004/0221176 A1 | 11/2004 | Cole |
| 2004/0250032 A1 | 12/2004 | Ji et al. |
| 2004/0268358 A1 | 12/2004 | Darling et al. |
| 2005/0005169 A1 | 1/2005 | Kelekar |
| 2005/0044422 A1 | 2/2005 | Cantrell et al. |
| 2005/0076066 A1 | 4/2005 | Stakutis et al. |
| 2005/0108393 A1 | 5/2005 | Banerjee et al. |
| 2005/0113941 A1 | 5/2005 | Ii et al. |
| 2005/0114700 A1 | 5/2005 | Barrie et al. |
| 2005/0160095 A1 | 7/2005 | Dick et al. |
| 2005/0172019 A1 | 8/2005 | Williamson et al. |
| 2005/0188079 A1 | 8/2005 | Motsinger et al. |
| 2005/0229255 A1 | 10/2005 | Gula et al. |
| 2005/0240604 A1 | 10/2005 | Corl, Jr. et al. |
| 2005/0251500 A1 | 11/2005 | Vahalia et al. |
| 2005/0268331 A1 | 12/2005 | Le et al. |
| 2005/0268332 A1 | 12/2005 | Le et al. |
| 2005/0273673 A1 | 12/2005 | Gassoway |
| 2005/0273857 A1 | 12/2005 | Freund |
| 2006/0174337 A1 | 8/2006 | Bernoth |
| 2006/0265748 A1 | 11/2006 | Potok |
| 2006/0294588 A1 | 12/2006 | Lahann et al. |
| 2007/0027913 A1 | 2/2007 | Jensen et al. |
| 2007/0192863 A1 | 8/2007 | Kapoor et al. |
| 2007/0195797 A1 | 8/2007 | Patel et al. |
| 2007/0288579 A1 | 12/2007 | Schunemann |
| 2008/0168561 A1 | 7/2008 | Durie et al. |
| 2009/0028147 A1 | 1/2009 | Russell |
| 2009/0041020 A1 | 2/2009 | Gibbons et al. |

OTHER PUBLICATIONS

Notice of Allowance issued by the U.S. Patent Office on Oct. 15, 2008 in connection with related U.S. Appl. No. 10/951,796.

Notice of Allowance issued by the U.S. Patent Office on Oct. 21, 2008 in connection with related U.S. Appl. No. 10/843,375.

European Office Action issued by the European Patent Office on Nov. 28, 2008 in connection with European patent application No. 07 015 003.2-2413, which corresponds to related U.S. Appl. No. 11/501,776.

Office Action issued by the U.S. Patent Office on Dec. 17, 2008 in connection with related U.S. Appl. No. 10/843,398.

Office Action issued by the U.S. Patent Office on Dec. 23, 2008 in connection with related U.S. Appl. No. 11/272,034.

Office Action issued on Feb. 5, 2008 in connection with the related U.S. Appl. No. 10/843,375.

Spitzner, Lance; Passive Fingerprinting, May 3, 2003; Focus on Intrusion Detection; pp. 1-4; obtained from http://www.ctillhq.com/pdfdb/000183/data.pdf.

Lyon, Gordon; Remote OS detection via TCP/IP Stack Fingerprinting, Jun. 30, 2002; pp. 1-12; obtained from: http://web.archive.org/web/20021017063625/www.insecure.org/nmap/nmap-fingerprinting-article.html.

U. Shankar and V. Paxson, *Active Mapping: Resisting NIDS Evasion Without Altering Traffic*, Proc. IEEE Symposium on Security and Privacy. May 2003, pp. 1-18.

Thomas H Ptacek et al., *Insertion, Evasion, and Denial of Service: Eluding Network Intrusion Detection*, Jan. 1998, pp. 1-63.

U.S. Appl. No. 10/843,353, filed May 2004, Roesch et al., System and Method for Determining Characteristics of a Network and Analyzing Vulnerabilities.

U.S. Appl. No. 10/843,373, filed May 2004, Roesch et al., Systems and Methods for Identifying the Services of a Network.

U.S. Appl. No. 10/843,374, filed May 2004, Roesch et al., System and Methods for Determining Characteristics of a Network Based on Flow Analysis.

U.S. Appl. No. 10/843,375, filed May 2004, Roesch et al., Systems and Methods for Determining Characteristics of a Network and Assessing Confidence.

U.S. Appl. No. 10/843,398, filed May 2004, Roesch et al., Systems and Methods for Determining Characteristics of a Network.

U.S. Appl. No. 10/843,459, filed May 2004, Roesch et al., Systems and Methods for Determining Characteristics of a Network and Enforcing Policy.
U.S. Appl. No. 10/898,220, filed Jul. 2004, Norton et al., Methods and Systems for Multi-Pattern Searching.
U.S. Appl. No. 10/951,796, filed Sep. 2004, Roelker et al., Intrusion Detection Strategies for Hypertext Transport Protocol.
U.S. Appl. No. 11/272,033, filed Nov. 2005, Dempster et al., Systems and Methods for Identifying the Client Applications of a Network.
U.S. Appl. No. 11/272,034, filed Nov. 2005, Vogel, III et al., Systems and Methods for Modifying Network Map Attributes.
U.S. Appl. No. 11/272,035, filed Nov. 2005, Gustafson et al., Intrusion Event Correlation with Network Discovery Information.
U.S. Appl. No. 11/501,776, filed Aug. 2006, Roesch et al., Device, System and Method for Analysis of Segments in a Transmission Control Protocol (TCP) Session.
U.S. Appl. No. 11/711,876, filed Feb. 2007, Sturges et al., Device, System and Method for Timestamp Analysis of Segments in a Transmission Control Protocol (TCP) Session.
U.S. Appl. No. 11/785,069, filed Apr. 2007, Norton et al., Methods and Systems for Multi-Pattern Searching.
U.S. Appl. No. 11/905,980, filed Oct. 2007, Roesch, Device, System and Method for Use of Micro-Policies in Intrusion Detection/Prevention.
U.S. Appl. No. 12/010,900, filed Jan. 2008, Norton et al., Methods and Systems for Multi-Pattern Searching.
U.S. Appl. No. 12/149,196, filed Apr. 2008, Ritterman, Real-Time User Awareness for a Computer Network.
U.S. Appl. No. 12/230,338, filed Aug. 2008, Sturges et al., Speed and Memory Optimization of Intrusion Detection System (IDS) and Intrusion Prevention System (IPS) Rule Processing.
Aho et al., "Efficient String Matching: An Aid to Bibliographic Search," *Communications from the ACM* (Jun. 1975), vol. 18, No. 6, pp. 333-340.
Tarjan, et al., "Storing a Sparse Table," Communications of the ACM (Nov. 1979), vol. 2, No. 11, pp. 606-620.
N. Chase, "Active Server pp. 3.0 from Scratch" (Dec. 1999), Searching for products section, 13 pp.
B. Krishnamurthy, "Web Protocols and Practice," (May 1, 2001), pp. 518-520.
D. Roelker, "HTTP IDS Evasions Revisited" (Aug. 1, 2003) [online] (retrieved on Nov. 9, 2006). Retrieved from the Internet <URL: http://docs.idsresearch.org/http_ids_evasions.pdf>.
Norton et al., "Multi-Patten Search Engine Aho-Corasick State Machine" (Mar. 17, 2004), Version 2.0, 36 pp.
M. Norton, "Optimizing Pattern Matching for Intrusion Detection" (Jul. 4, 2004) [online] (retrieved on Nov. 9, 2006). Retrieved from the Internet <URL: http://docs.idsresearch.org/OptimizingPatternMatchingForIDS.pdf>.
Norton et al., "Sourcefire Optimizing Pattern Matching for Intrusion Detection" (Sep. 2004), 14 pp.
"toupper( )—convert lowercase character to uppercase," http://www.mkssoftware.com, printed on Sep. 20, 2008 from http://web.archive.org, archive date Jun. 30, 2006, 2 pp.
J. Novak et al., "Target-Based TCP Stream Reassembly" (Aug. 3, 2007), Revision 1.0, pp. 1-23, obtained from: http://www.snort/org/docs/stream5-modelAUg032007.pdf.
"TaoSecurity—Dedicated to FreeBSD, network security monitoring, incident response, and network forensics," (Oct. 1, 2007), obtained from: http://taosecurity.blogspot.com/2005/02/shmoocon-concludes-shmoocon-finished.html.
Office Action issued by the U.S. Patent Office on Jul. 16, 2007 in connection with related U.S. Appl. No. 10/898,220.
Office Action issued by the U.S. Patent Office on Sep. 6, 2007 in connection with related U.S. Appl. No. 10/843,374.
Notice of Allowance issued by the U.S. Patent Office on Sep. 6, 2007 in connection with related U.S. Appl. No. 10/843,376.
Office Action issued by the U.S. Patent Office on Sep. 26, 2007 in connection with related U.S. Appl. No. 10/843,353.
Office Action issued by the U.S. Patent Office on Oct. 4, 2007 in connection with related U.S. Appl. No. 10/951,796.
Notice of Allowance issued by the U.S. Patent Office on Oct. 5, 2007 in connection with related U.S. Appl. No. 10/793,887.
International Search Report and Written Opinion of the International Searching Authority issued on Oct. 9, 2007 in connection with PCT application No. PCT/US06/43800, which corresponds to U.S. Appl. No. 11/272,034.
Office Action issued by the U.S. Patent Office on Nov. 21, 2007 in connection with related U.S. Appl. No. 10/843,398.
International Search Report and Written Opinion of the International Searching Authority issued on Dec. 5, 2007 in connection with PCT application No. PCT/US05/25583, which corresponds to U.S. Appl. No. 10/951,796.
European Search Report issued by the European Patent Office on Dec. 27, 2007 in connection with European patent application No. 07015003.2-2413, which corresponds to related U.S. Appl. No. 11/501,776.
Office Action issued by the U.S. Patent Office on Jan. 10, 2008 in connection with related U.S. Appl. No. 10/843,373.
Office Action issued by the U.S. Patent Office on Feb. 21, 2008 in connection with related U.S. Appl. No. 11/272,033.
Office Action issued by the U.S. Patent Office on Mar. 12, 2008 in connection with related U.S. Appl. No. 10/843,459.
Office Action issued by the U.S. Patent Office on Mar. 20, 2008 in connection with related U.S. Appl. No. 10/843,374.
Final Office Action issued by the U.S. Patent Office on May 9, 2008 in connection with related U.S. Appl. No. 10/843,353.
International Preliminary Report on Patentability mailed on May 22, 2008 in connection with PCT application No. PCT/US06/43800, which corresponds to U.S. Appl No. 11/272,034.
Final Office Action issued by the U.S. Patent Office on Jun. 4, 2008 in connection with related U.S. Appl. No. 10/843,398.
International Search Report and Written Opinion of the International Searching Authority issued on Jun. 19, 2008 in connection with PCT application No. PCT/US05/25584, which corresponds to U.S. Appl. No. 10/898,220.
Final Office Action issued by the U.S. Patent Office on Jun. 26, 2008 in connection with related U.S. Appl. No. 10/898,220.
International Search Report and Written Opinion of the International Searching Authority issued on Jun. 30, 2008 in connection with PCT application No. PCT/US07/21351, which corresponds to U.S. Appl No. 11/905,980.
International Search Report and Written Opinion of the International Searching Authority issued on Jul. 2, 2008 in connection with PCT application No. PCT/US08/02454, which corresponds to U.S. Appl. No. 11/711,876.
International Search Report and Written Opinion of the International Searching Authority issued on Jul. 7, 2008 in connection with PCT application No. PCT/US06/43820, which corresponds to U.S. Appl. No. 11/272,035.
Office Action issued by the U.S. Patent Office on Jul. 11, 2008 in connection with related U.S. Appl. No. 11/272,034.
Final Office Action issued by the U.S. Patent Office on Jul. 17, 2008 in connection with related U.S. Appl. No. 10/843,459.
Final Office Action issued by the U.S. Patent Office on Aug. 6, 2008 in connection with related U.S. Appl. No. 10/843,375.
Notice of Allowance issued by the U.S. Patent Office on Aug. 18, 2008 in connection with related U.S. Appl. No. 1/272,033.
International Search Report and Written Opinion of the International Searching Authority issued on Aug. 18, 2008 in connection with PCT application No. PCT/US08/05466, which corresponds to U.S. Appl. No. 12/149,196.
Final Office Action issued by the U.S. Patent Office on Aug. 19, 2008 in connection with related U.S. Appl. No. 10/843,373.
Final Office Action issued by the U.S. Patent Office on Aug. 20, 2008 in connection with related U.S. Appl. No. 10/843,353.
European Search Report issued by the European Patent Office on Nov. 22, 2007 in connection with corresponding European patent application No. 07014575.0-1244.
Judy Novak, "Target-Based Fragmentation Reassembly," Revision 2.0, Apr. 2005, pp. 1-32.
"Snort™ Users Manual 2.6.0," *The Snort Project*, May 23, 2006, pp. 1-126.
Summit Siddharth, "Evading NIDS, revisited," Dec. 12, 2005.
T. Ptacek, et al., "Insertion, Evasion, and Denial of Service: Eluding Network Intrusion Detection," Jan. 1998.

U. Shankar, et al., "Active Mapping: Resisting NIDS Evasion Without Altering Traffic," *Proceedings of the 2003 IEEE Symposium on Security and Privacy*, 2003, pp. 1-18.
Office Action issued by the U.S. Patent Office on Jan. 16, 2009 in connection with related U.S. Appl. No. 10/843,353.
Notice of Allowance issued by the U.S. Patent Office on Jan. 21, 2009 in connection with related U.S. Appl. No. 10/898,220.
Office Action issued by the U.S. Patent Office on Feb. 4, 2009 in connection with related U.S. Appl. No. 10/843,373.
Office Action issued by the U.S. Patent Office on Feb. 9, 2009 in connection with related U.S. Appl. No. 10/843,459.
International Preliminary Report on Patentability and Written Opinion of the International Searching Authority mailed on Mar. 3, 2009 in connection with PCT application No. PCT/US05/025584, which corresponds to related U.S. Appl. No. 10/898,220.
International Preliminary Report on Patentability and Written Opinion of the International Searching Authority mailed on Mar. 17, 2009 in connection with corresponding PCT application No. PCT/US06/43820, which corresponds to related U.S. Appl. No. 11/272,035.
R. Deraison, et al., "Passive Vulnerability Scanning: Introduction to NeVO," *Tenable Network Security*, May 30, 2004, pp. 1-13.
Full Band and Matrix Algorithms (Jun. 9, 2004), http://web.archive.org/web20040109154658/http://www.netlib.org/utk/Isi/pewLSI/text/node150.html.
R. Deraison, et al., "Nessus Network Auditing," *Sungress Publishing*, Jul. 20, 2004, pp. 1-13.
International Preliminary Report on Patentability mailed on Apr. 7, 2009 in connection with PCT application No. PCT/US07/021351, which corresponds to U.S. Appl No. 11/905,980.
Office Action issued by the U.S. Patent Office on Apr. 28, 2009 in connection with related U.S. Appl. No. 11/501,776.
Final Office Action issued by the U.S. Patent Office on May 13, 2009 in connection with related U.S. Appl. No. 10/843,374.
Office Action issued by the U.S. Patent Office on May 14, 2009 in connection with related U.S. Appl. No. 11/272,034.
International Search Report and Written Opinion of the International Searching Authority mailed on May 27, 2009 in connection with PCT application No. PCT/US09/02210, which corresponds to U.S. Appl. No. 12/230,338.
Office Action issued by the U.S. Patent Office on Jun. 1, 2009 in connection with related U.S. Appl. No. 11/272,035.
Notice of Allowance issued by the U.S. Patent Office on Jun. 11, 2009 in connection with related U.S. Appl. No. 10/843,373.
Office Action issued by the U.S. Patent Office on Jun. 23, 2009 in connection with related U.S. Appl. No. 11/785,609.
Office Action issued by the U.S. Patent Office on Jul. 6, 2009 in connection with related U.S. Appl. No. 10/843,459.
Office Action issued by the U.S. Patent Office on Jul. 7, 2009 in connection with related U.S. Appl. No. 10/843,398.
Office Action issued by the U.S. Patent Office on Jul. 28, 2009 in connection with related U.S. Appl. No. 10/843,353.
Office Action issued by the U.S. Patent Office on Aug. 20, 2009 in connection with related U.S. Appl. No. 10/843,374.
International Preliminary Report on Patentability mailed on Sep. 11, 2009 in connection with PCT application No. PCT/US08/002454, which corresponds to U.S. Appl. No. 11/711,876.
Advisory Action issued by the U.S. Patent Office on Sep. 29, 2009 in connection with related U.S. Appl. No. 10/843,459.
J. Howe, "An Environment for "Sniffing" DCE-RPC Traffic," *CITI Technical Report 93-4*, Jun. 21, 1993, 12 pages total.
European Search Report issued by the European Patent Office on Oct. 12, 2009 in connection with European patent application No. 05773501.1-2201, which corresponds to related U.S. Appl. Nos. 10/898,220, 11/785,609 and 12/010,900.
Final Office Action issued by the U.S. Patent Office on Oct. 29, 2009 in connection with related U.S. Appl. No. 11/501,776.
International Preliminary Report on Patentability mailed on Nov. 12, 2009 in connection with PCT application No. PCT/US08/005466, which corresponds to U.S. Appl. No. 12/149,196.
Advisory Action issued by the U.S. Patent Office on Dec. 2, 2009 in connection with related U.S. Appl. No. 10/843,398.
Notice of Allowance issued by the U.S. Patent Office on Dec. 8, 2009 in connection with related U.S. Appl. No. 11/501,776.
Final Office Action issued by the U.S. Patent Office on Dec. 8, 2009 in connection with related U.S. Appl. No. 11/272,034.
Final Office Action issued by the U.S. Patent Office on Dec. 9, 2009 in connection with related U.S. Appl. No. 11/272,035.
R. Gula, "Passive Vulnerability Detection. *Techniques to passively find network security vulnerabilities*," Sep. 9, 1999 (5 pp.).
R.P. Lippmann et al., "Passive Operating System Identification from TCP/IP Packet Headers," *Proceedings Workshop on Data Mining for Computer Security (DMSEC)*, Nov. 2003 (10 pp.).
N. Brownlee, et al., "Methodology for Passive Analysis of a University Internet Link," *PAM2001 Passive and Active Measurement Workshop*, Apr. 2001 (7 pp.).
Notice of Allowance issued by the U.S. Patent Office on Jan. 7, 2010 in connection with related U.S. Appl. No. 10/843,353.
Notice of Allowance issued by the U.S. Patent Office on Jan. 8, 2010 in connection with related U.S. Appl. No. 10/843,373.
Office Action issued by the European Patent Office on Jan. 15, 2010 in connection with European patent application No. 05773501.1-2201, which corresponds to related U.S. Appl. Nos. 10/898,220, 11/785,609 and 12/010,900.
Advisory Action issued by the U.S. Patent Office on Feb. 24, 2010 in connection with related U.S. Appl. No. 11/272,035.
Notice of Allowance issued by the U.S. Patent Office on Mar. 5, 2010 in connection with related U.S. Appl. No. 11/785,609.
Final Office Action issued by the U.S. Patent Office on Mar. 17, 2010 in connection with related U.S. Appl. No. 10/843,374.
Notice of Allowance issued by the U.S. Patent Office on Feb. 5, 2010 in connection with related U.S. Appl. No. 11/272,034.
Office Action issued by the U.S. Patent Office on Mar. 16, 2010 in connection with related U.S. Appl. No. 11/272,035.
International Search Report and Written Opinion of the International Searching Authority issued on Mar. 16, 2010 in connection with PCT application No. PCT/US09/59965, which corresponds to U.S. Appl. No. 12/575,612.
V. Jacobson, et al., Request for Comments: 1323, "TCP Extensions for High Performance," May 1992 (35 pages).
D. Joseph, et al., "A Policy-aware Switching Layer for Data Centers," *SIGCOMM*, Aug. 17-22, 2008, pp. 51-62.
Office Action issued by the U.S. Patent Office on Apr. 7, 2010 in connection with related U.S. Appl. No. 11/711,876.
Office Action issued by the U.S. Patent Office on Apr. 15, 2010 in connection with related U.S. Appl. No. 12/010,900.
Office Action issued by the U.S. Patent Office on Apr. 21, 2010 in connection with related U.S. Appl. No. 10/843,459.
Notice of Allowance issued by the U.S. Patent Office on May 24, 2010 in connection with related U.S. Appl. No. 10/843,398.
U.S. Appl. No. 12/813,859, filed Jun. 2010, Polley et al.
R. Hiyoshi, "Practical Guide to Intrusion Detection System: Snort & Tripwire," Japan, Apr. 25, 2004, pp. 57-230 (concise English explanation of relevance attached).
Advisory Action issued by the U.S. Patent Office on Aug. 3, 2010 in connection with related U.S. Appl. No. 10/843,374.
Final Office Action issued by the U.S. Patent Office on Sep. 8, 2010 in connection with related U.S. Appl. No. 10/843,459.
Final Office Action issued by the U.S. Patent Office on Sep. 17, 2010 in connection with related U.S. Appl. No. 11/711,876.
Office Action mailed Sep. 7, 2010 from the Japan Patent Office for Japanese patent application No. 2007-523639 in connection with related U.S. Appl. No. 10/951,796, now U.S. patent No. 7,496,962 (English translation enclosed).
Notice of Allowance issued by the U.S. Patent Office on Oct. 5, 2010 in connection with related U.S. Appl. No. 10/843,374.
International Preliminary Report on Patentability mailed on Oct. 19, 2010 in connection with PCT application No. PCT/US2009/02210, which corresponds to U.S. Appl. No. 12/230,338.
Final Office Action issued by the U.S. Patent Office on Oct. 25, 2010 in connection with related U.S. Appl. No. 11/272,035.
Final Office Action issued by the U.S. Patent Office on Nov. 4, 2010 in connection with related U.S. Appl. No. 10/843,459.
Office Action issued by the U.S. Patent Office on Nov. 19, 2010 in connection with related U.S. Appl. No. 10/843,459.

Final Office Action issued by the U.S. Patent Office on Nov. 24, 2010 in connection with related U.S. Appl. No. 12/010,900.

Office Action issued by the U.S. Patent Office on Dec. 22, 2010 in connection with related U.S. Appl. No. 11/905,980.

U.S. Appl. No. 12/969,682, filed Dec. 2010, Roesch et al.

"Snort™Users Manual 2.2.0RC1," *The Snort Project*, Jun. 28, 2004, Retrieved from the Internet: URL:http://cvs.snort.org/viewcvs.cgi/*checkout*/snort/doc/snort_manual.pdf?rev=1.25&content-type=application/pdf [retrieved on Nov. 18, 2010] (XP002610157).

V. Yegneswaran, et al., "Internet Sieve: An Architecture for Generating Resilient Signatures," May 2004, Retrieved from the Internet: URL:http://www.cc.gatech.edu/~giffin/papers/tr1507.pdf [retrieved on Nov. 18, 2010] (XP002610154).

D. Roekler, "HTTP IDS Evasions Revisited," Jan. 8, 2003, Retrieved from the Internet: URL:http://docs.idsresearch.org/http_ids_evasions.pdf [Nov. 18, 2010](XP002610155).

M. Norton, et al., "The New Snort," *Computer Security Journal*, CSI Security Institute, XIX, No. 3 (Jan. 1, 2003), pp. 37-47, ISSN: 0277-0865 (XP008039475).

European Search Report issued by the European Patent Office on Dec. 6, 2010 in connection with European patent application No. 05773540.9-2413, which corresponds to related U.S. Patent No. 7,496,962.

Notice of Allowance issued by the U.S. Patent Office on Jan. 24, 2011 in connection with related U.S. Appl. No. 10/843,459.

\* cited by examiner

P2 – P4 – P1 – P3 = | AAAAAAAA | BBBBBBBB | CCCCCCCC | DDDDDDDD |

= AAAAAAAABBBBBBBBCCCCCCCCDDDDDDDD

P2 – P4 – P1 – P3 = | AAAAAAAA | BBBBBBBB | CCCCCCCC |

= AAAAAAAABBBBBBBBCCCCCCCC

P2 – P4 – P1 – P3 = | AAAAAAAA | BBBBBBBB | | DDDDDDDD |

= AAAAAAAABBBBBBBBDDDDDDDD

DEVICE, SYSTEM AND METHOD FOR ANALYSIS OF FRAGMENTS IN A FRAGMENT TRAIN

FIELD OF THE INVENTION

The present invention relates in general to network traffic analysis, and more specifically to analyzing fragments in a fragment train, optionally in connection with intrusion detection/prevention.

BACKGROUND OF THE INVENTION

The Internet protocol (IP) layer protocol utilized in packet network communications allows an IP packet to be separated en route into smaller fragments which are ultimately sent to the destination, referred to herein as the target system. Each fragment still belongs to the original IP packet, and can be reassembled by the target system to re-create the original IP packet.

Different kinds of operating systems have unique methods of fragment reassembly. These methods of reassembling fragments can be exploited by attackers. In their landmark 1998 paper, "Insertion, Evasion, and Denial of Service: Eluding Network Intrusion Detection," Thomas Ptacek and Timothy Newsham exposed some weaknesses in intrusion detection systems (IDS). The authors revealed that an IDS cannot be effective and accurate because it does not necessarily process or even observe network traffic exactly as the destination host that receives the message does.

If an IDS utilizes a single reassembly method, it may not reassemble and process the packets in the same way that the destination system does. Consequently, an attack that successfully exploits these differences in fragment reassembly can cause the IDS to miss the malicious traffic.

SUMMARY OF THE INVENTION

Accordingly, one or more embodiments of the present invention provide methods, systems, and computer readable mediums for analyzing fragment trains in a communication network. A fragment train includes multiple fragments in the same fragment train which are associated with the same target system. The method includes identifying at least one fragment reassembly policy of plural fragment reassembly policies, the at least one fragment reassembly policy corresponding to a target system associated with fragments in a fragment train. The method also includes providing data in the fragments in the fragment train in an order indicated by the at least one fragment reassembly policy, the at least one fragment reassembly policy including determining the order responsive to an offset and a more fragments indication in the fragments.

Another embodiment provides a computer-readable medium comprising instructions for execution by a computer. The instructions include a computer-implemented method for analyzing fragment trains in a communication network, a fragment train including multiple fragments in the same fragment train and associated with the same target system, where fragments can be non-overlapped, comprehensively overlapped, partially overlapped, or completely overlapped. The instructions implement identifying at least one fragment reassembly policy of plural fragment reassembly policies, the at least one fragment reassembly policy corresponding to a target system associated with fragments in a fragment train. The instructions also implement providing data in the fragments in the fragment train in an order indicated by the at least one fragment reassembly policy, the at least one fragment reassembly policy indicating an order specific to at least comprehensively overlapped fragments.

Yet another embodiment provides a computer system for at least one of detecting and preventing intrusion. The computer system includes a unit configured to facilitate determining a kind of host associated with a target system, in response to an indication of the target system in fragments in a fragment train. Also included is a fragment reassembly unit configured to facilitate identifying at least one fragment reassembly policy of plural fragment reassembly policies, the at least one fragment reassembly policy corresponding to the kind of host associated with the fragments in the fragment train. The computer system also includes an order providing unit configured to facilitate providing data in the fragments in the fragment train in an order indicated by the at least one fragment reassembly policy.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

Figure 1:
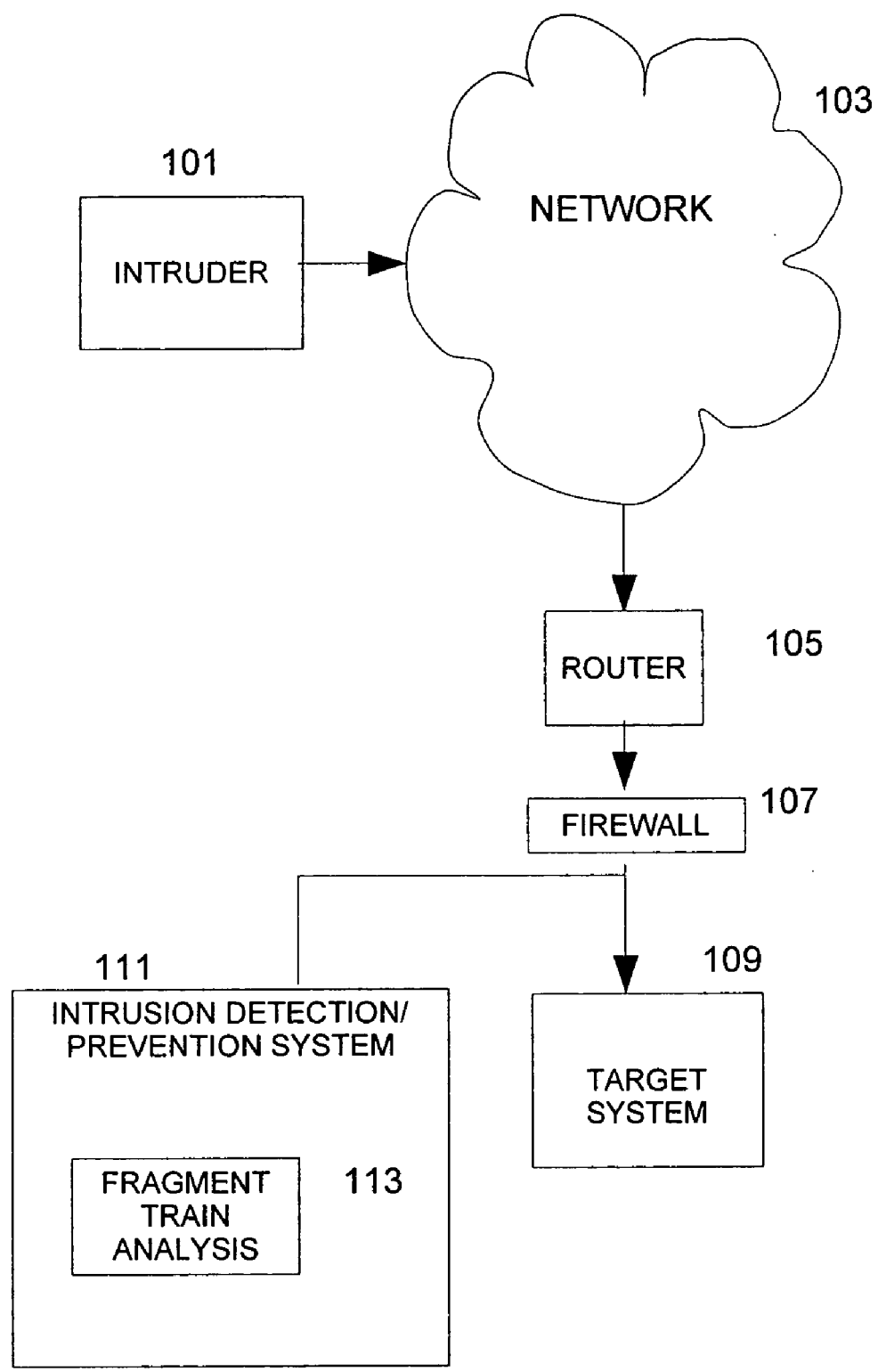
FIG. 1 is a diagram illustrating a simplified and representative environment associated with fragment train analysis.

In overview, the present disclosure concerns analysis of network traffic on communication networks, often referred to as packet switching networks, which support communication from wireless and/or wire line devices to a target system. Such communication networks may forward communication packets which have been broken into fragments. More particularly, various inventive concepts and principles are embodied in systems, devices, and methods therein for analyzing fragments, optionally in connection with intrusion detection/prevention systems.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Relational terms such as first and second, and the like, if any, are used herein solely to distinguish one from another entity, item, or action without necessarily requiring or implying any actual such relationship or order between such entities, items or actions. Some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Even though a problem with fragment analysis was identified by Ptacek and Newsham, many problems still exist in analyzing fragments. As further discussed herein, various inventive principles and combinations thereof are advantageously employed to improve analysis of fragments. The analysis of fragments can consider the operating system and applications on the target system, so that traffic sent to the target system can be analyzed in the same manner as the target system itself analyzes the traffic. This can reduce false positives about irrelevant alerts, such as an exploit specific to a WINDOWS operating system bound for a host running a UNIX operating system. Moreover, deliberately mangled packets are less likely to dupe the intrusion detection/prevention system.

Further in accordance with exemplary embodiments, the problems posed by overlapping fragments can be solved by reassembling overlapping fragments in the same manner as the target system happens to assemble fragments. Fragmentation reassembly policies can be provided, corresponding to target systems and/or the kinds of hosts associated with target systems. Thus, the fragment analysis can apply the appropriate one of the reassembly policies depending on the target system. The fragment analysis can handle all types of overlapping fragments, thereby reducing evasion attacks that use overlapping fragments. Moreover, the fragment analysis can interpret multiple fragments in a fragment train in the same manner as the target system, even when the multiple fragments are not properly indicated.

Referring to FIG. 1, a diagram illustrating a simplified and representative environment associated with fragment train analysis will be discussed and described. In the illustration, an intruder 101 (such as a computer system) transmits a communication including a packet to a target system 109. In this example, the packet is transmitted via a network 103, a router 105, and a firewall 107 to the target system 109. The communications to the target system 109 can be monitored with well known techniques by an intrusion detection/prevention system 111. Although this illustration provides a sensor behind the firewall 107, the sensor can be provided anywhere before the target system 109. Alternatively, the intrusion detection/prevention system 111 can be provided in-line with the target system 109, or can be incorporated into the target system 109.

A packet can be divided at the Internet protocol ("IP") layer into fragments in accordance with known techniques, which are then sent to the target system 109, and the target system reassembles the fragments into the packet. The order in which the target system 109 reassembles fragments is a by-product of the fragment processing in the particular operating system on the target system 109. The method in which fragments are reassembled by a particular system can be exploited by the intruder 101. Note that although this illustration assumes an intruder 101 sending packets or fragments, fragments or packets that are analyzed can be sent from anywhere.

The process of creating fragments is discussed for example in connection with FIG. 2, and overlapping fragments are generally discussed in connection with FIG. 3. A detailed discussion of types of overlapping fragments is provided in connection with FIG. 8 and FIG. 9. In addition, the process of creating fragments utilizes a "more fragments" indication, to indicate whether or not there are additional fragments. FIG. 4-FIG. 7 discuss example issues related to the analysis of multiple no more fragments indications. Overlapping fragments and/or multiple no more fragments indications are handled differently by different kinds of hosts.

Figure 2:
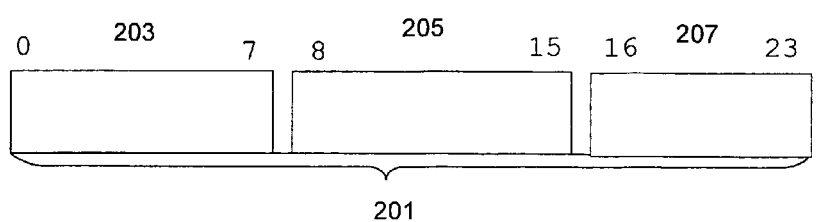
FIG. 2 is a diagram illustrating non-overlapping fragments in a fragment train.

Referring to FIG. 2, a diagram illustrating non-overlapping fragments in a fragment train 201 will be discussed and described. Here, an IP packet created at the IP layer has been divided into fragments 203, 205, 207. Each fragment is provided with its own header including information identifying the original IP packet as well as the location of the fragment's data in the original IP packet. The fragments 203, 205, 207 belong in the same fragment train, which can be reassembled to recreate the data in the original IP packet.

In this illustration, the fragments 203, 205, 207 are received in sequence. The first fragment 203 includes bytes 0-7, the second fragment includes bytes 8-15 and the third fragment includes bytes 16-23. (Headers are omitted for clarity.) Thus, the reassembly of the fragments is straightforward and typically is handled properly.

Figure 3:
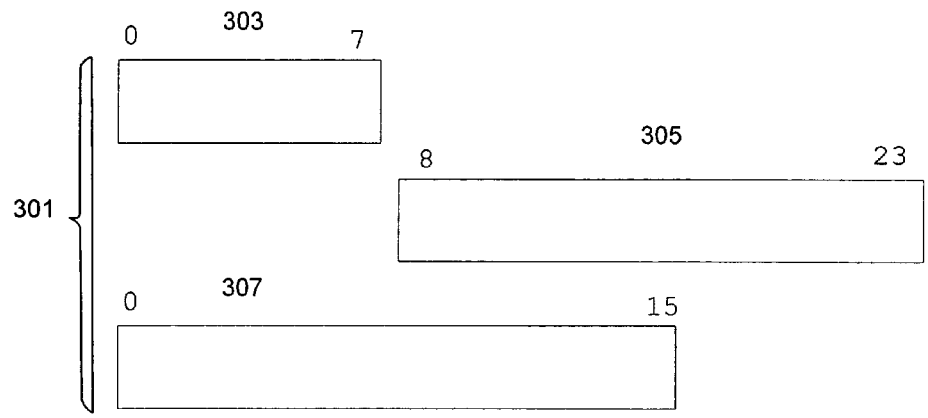
FIG. 3 is a diagram illustrating overlapping fragments in a fragment train.

Referring to FIG. 3, a diagram illustrating overlapping fragments in a fragment train 301 will be discussed and described. FIG. 3 illustrates the same original IP packet as in FIG. 2, which is divided into different fragments 303, 305, 307. In this example, the first fragment 303 includes bytes 0-7, and the second fragment includes bytes 8-23. The third fragment includes bytes 0-15, and overlaps both the first and second fragments. These packets are ostensibly in the same fragment train.

A WINDOWS system, for example, will reassemble the first fragment 303 and the second fragment 305, whereas a CISCO system will reassemble the third fragment 307 and bytes 16-23 from the second fragment 305. Suppose that an intruder intends to evade the intrusion detection/prevention system by sending overlapping fragments that different in content. In order for an intrusion detection/prevention system to detect/prevent the attack, it should analyze the fragments as they will be reassembled by the target system.

Although this is a simple illustration of overlapping fragments, fragment reassembly can be complicated by considerations such as the location of the overlap of the fragments, discussed in connection with FIG. 8 and FIG. 9.

Figures 4, 5, 6, 7:
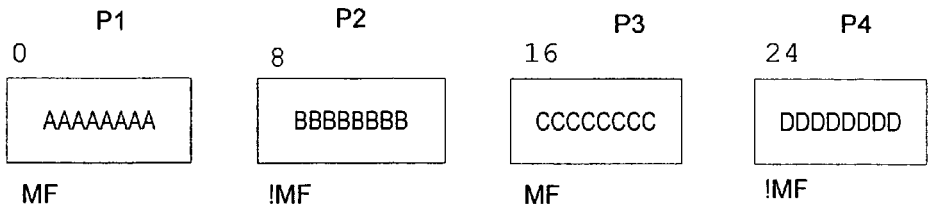
FIG. 4 is a diagram illustrating fragments with a more fragments indication, in a fragment train.
FIG. 5 is a diagram illustrating a first analysis of a sequence of fragments in the fragment train corresponding to FIG. 4.
FIG. 6 is a diagram illustrating a second analysis of the sequence of fragments in the fragment train corresponding to FIG. 4.
FIG. 7 is a diagram illustrating a third analysis of the sequence of the fragments in the fragment train corresponding to FIG. 4.

A discussion of the complications presented by the use of the more fragments indication is provided in connection with FIG. 4-FIG. 7. FIG. 4 illustrates fragments in a fragment train where two or more fragments each purport to be the last fragment, and FIG. 5-FIG. 7 illustrate the reassembly of a particular sequence of the fragments of FIG. 4, according to a WINDOWS 2000 system, a CISCO system, and a SOLARIS 10 system, respectively.

Referring to FIG. 4, a diagram illustrating fragments with a more fragments indication in a fragment train will be discussed and described. In this example, the content of the original IP packet is "AAAAAAAABBBBBBBBC-CCCCCCCDDDDDDDD". The packet is divided into four fragments P1, P2, P3, P4 with the content of, respectively, "AAAAAA," "BBBBBBBB," "CCCCCCCC," and "DDDDDDDD."

Each of the fragments P1, P2, P3, P4 can include an indication that there are multiple fragments in the fragment train. Further, the last fragment in a fragment train can be indicated. Conventional techniques call for the fragments to set a "more fragments" flag for all but the last fragment. Here, the first and third fragments P1, P3 have the "more fragments" flag set, and the second and fourth fragments P2, P4 do not have the "more fragments" flag set. Hence, there is an error in the more fragments indication.

Different operating systems accept or reject particular fragments where there are multiple potential last fragments. In addition, different operating systems may accept different numbers of multiple last fragments.

FIG. 5-FIG. 7 examine how the fragment train is reassembled according to various systems. In each of these examples, the sequence of fragments from FIG. 4 is received in the order P2, P4, P1, P3.

Referring to FIG. 5, a diagram illustrating a first analysis of a sequence of fragments in the fragment train corresponding to FIG. 4 will be discussed and described. A WINDOWS 2000 system will reassemble each of the fragments in this sequence in the order, "AAAAAAAA," "BBBBBBBB," "CCCCCCCC," "DDDDDDDD." Therefore, the original IP packet will be recreated as "AAAAAAAABBBBBBBBC-CCCCCCCDDDDDDDD."

Referring to FIG. 6, a diagram illustrating a second analysis of the sequence of fragments in the fragment train corresponding to FIG. 4 will be discussed and described. A CISCO system will reassemble the fragments in the order "AAAAAAAA," "BBBBBBBB," "CCCCCCCC," and will drop the fourth fragment P4 with the content "DDDDDDDD." Therefore, the content of the reassembled packet is "AAAAAAAABBBBBBBBCCCCCCCC."

The CISCO system thus handled the multiple "more fragments" indications by dropping the last fragment in the fragment train.

Referring to FIG. 7, a diagram illustrating a third analysis of the sequence of the fragments in the fragment train corresponding to FIG. 4 will be discussed and described. A SOLARIS 10 system will reassemble the fragments in the order "AAAAAA," "BBBBBBBB," and "DDDDDDDD," as bytes 0-7, 8-15 and 24-31, respectively. It will drop the third fragment P3 with the content "CCCCCCCC." The content of the reassembled packet is "AAAAAAAABBBBBBBBD-DDDDDDD." The SOLARIS 10 system thus dealt with the multiple "more fragments" indications by dropping the last received fragment.

Consider the following additional examples of reassembly, where the sequence of fragments in the fragment train of FIG. 4 is received in the order P4-P2-P1-P3. The reassembled packet is "AAAAAAAABBBBBBBBCCCCCCCCD-DDDDDDD" for the FREEBSD 5.1 operating system, the SOLARIS 10 operating system, and the OPENBSD 3.6 operating system. For the CISCO operating system, the reassembled packet is "AAAAAAAABBBBBBBBC-CCCCCCC." the LINUX 2.2 operating system, LINUS 2.4 operating system, WINDOWS 2000 operating system AND the WINDOWS XP operating system do not honor the incoming fragments, perhaps recognizing that these fragments have errors.

According to one or more embodiments, a plurality of target systems including the target system are provided, the target system being associated with a kind of host, respective kinds of host being associated with respective fragment reassembly policies, and the at least one fragment reassembly policy which is identified is associated with the kind of host associated with the target system.

Fragment reassembly is complicated by the location of the overlap of the fragments, discussed in connection with FIG. 8 and FIG. 9. The discussion of FIG. 8 is an analysis by the inventors of the types of overlapping fragments recognized by Vern Paxson and Umesh Shankar ("Paxson/Shankar"); the discussion of FIG. 9 recognizes additional types of overlapping fragments. In both FIG. 8 and FIG. 9, the "original fragments" are the fragments that arrived first, and the "overlapping fragments" are the fragments that arrived after the original fragments. The offset indicates the byte displacement of the fragment. The offsets in FIG. 9 assume that it is a continuation of the fragments in FIG. 8.

Figure 8:
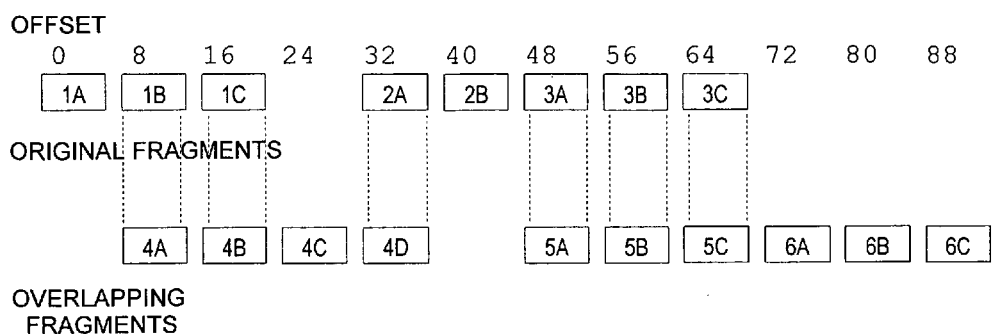
FIG. 8 is a diagram illustrating a prior art model for analyzing overlapping fragments.

Referring to FIG. 8, a diagram illustrating a prior art model for analyzing overlapping fragments will be discussed and described. In the paper titled "Active Mapping: Resisting NIDS Evasion Without Altering Traffic," authors Vern Paxson and Umesh Shankar discuss fragmentation techniques as a means of evading intrusion detection systems. A test of the Paxson/Shankar model reveals five different fragment reassembly methods: (1) BSD operating system favors an original fragment with an offset that is less than or equal to a subsequent fragment; (2) BSD-right operating system favors a subsequent fragment when the original fragment has an offset that is less than or equal to the subsequent offset; (3) LINUX operating system favors an original fragment with an offset that is less than a subsequent fragment; (4) First favors the original fragment with a given offset; and (5) Last favors the subsequent fragment with a given offset.

Testing of the Paxson/Shankar model reveals that Paxson/Shankar considered some, but not all, types of overlapped fragments: (1) a fragment that is wholly overlapped by a subsequent fragment with an identical offset and length ("completely overlapped"); (2) a fragment that is partially overlapped by a subsequent fragment with an offset greater than the original ("partially overlapped"); and (3) a fragment that is partially overlapped by a subsequent fragment with an offset less than the original ("partially overlapped").

In FIG. 8, there are six different fragments, with each illustrated box representing an 8-byte chunk of a fragment. Chunks 1A, 1B, 1C represent a first fragment; chunks 2A, 2B represent a second fragment; chunks 3A, 3B, 3C represent a third fragment, chunks 4A, 4B, 4C, 4D represent a fourth fragment; chunks 5A, 5B, 4C represent a fifth fragment; and chunks 6A, 6B, 6C represent a sixth fragment.

In FIG. 8, the fifth fragment 5A, 5B, 5C completely overlaps the third fragment 3A, 3B, 3C. They both start at the same offset, 48, and are the same length, 24 bytes long. Hence, the third and fifth fragments illustrate an overlap of the type referred to herein as a "completely overlapping fragment," or a complete overlap.

The fourth fragment 4A, 4B, 4C, 4D partially overlaps the first fragment 1A, 1B, 1C. The offset of the fourth fragment starts after the first fragment and the length of the fourth fragment is such that it ends after the first fragment. The fourth fragment 4A, 4B, 4C, 4D also partially overlaps the second fragment 2A, 2B. The fourth fragment starts before the second fragment and ends before the second fragment. The fourth fragment illustrates overlaps of the type referred to herein as a "partially overlapping fragment," or a "partial overlap."

Also illustrated in FIG. 8 is a fragment of the type referred to herein as a "non-overlapping fragment," or a "non-overlap." The offset and length of the sixth fragment 6A, 6B, 6C are such that it does not have any overlap with any subsequent or previous fragment.

The model illustrated in FIG. 8, however, is incomplete since it does not provide for all different combinations of fragment placement. For example, it never considers a subsequent fragment with a starting offset greater than the original fragment and an ending offset less than the original fragment. WINDOWS and SOLARIS operating systems reassemble this particular example differently. Consequently, other types of overlapping fragments must be considered.

Figure 9:
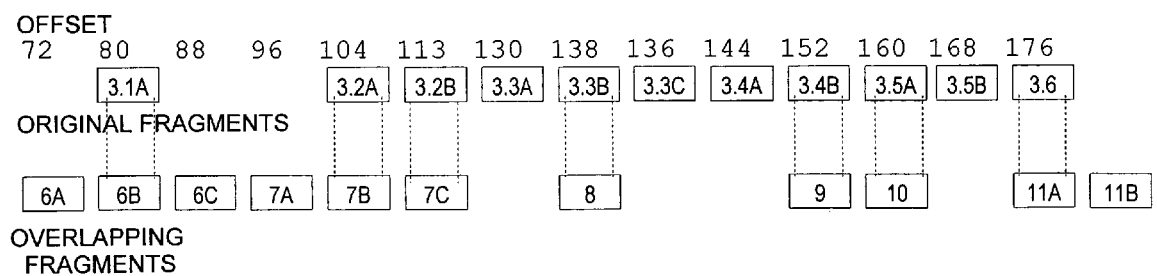
FIG. 9 is a diagram illustrating a model for analyzing overlapping fragments, including comprehensively overlapping fragments.

Referring to FIG. 9, a diagram illustrating a model for analyzing overlapping fragments including comprehensively overlapping fragments will be discussed and described. FIG. 9 provides an illustration of various comprehensively overlapped fragments. This model adds original fragment 3.1 (including chunk 3.1A), original fragment 3.2 (including chunks 3.2A, 3.2B), original fragment 3.3 (including chunks 3.3A, 3.3B, 3.3C), original fragment 3.4 (including chunks 3.4A, 3.4B), fragment 3.5 (including chunks 3.5A, 3.5B) and fragment 3.6, all of which immediately follow original fragments 1-3 illustrated in FIG. 8. This model also uses subsequent fragment 6 (including chunks 6A, 6B, 6C), fragment 7 (including chunks 7A, 7B, 7C), fragment 8, fragment 9, fragment 10, and fragment 11 (including chunks 11A, 11B), all of which follow subsequent fragments 4-6 illustrated in FIG. 8.

Fragments which are referred to herein as "comprehensively overlapping fragments," or "comprehensive overlap," include those where the offset and length of the data of one of the overlapped fragments is such that the data is comprehended (i.e., encompassed) by data of the other overlapped fragment; however, "comprehensive overlap" does not include the case where the offset and length are identical.

The "comprehensively overlapped fragments" include the following examples: the original fragment starts before the subsequent fragment and ends after the subsequent fragment (e.g., fragment 3.3 and fragment 8); the original fragment starts before the subsequent fragment and ends the same as the subsequent fragment (e.g., fragment 3.4 and fragment 9); the original fragment starts the same as the subsequent fragment and ends after the subsequent fragment (e.g., fragment 3.5 and fragment 10); the original fragment starts the same as the subsequent fragment and ends before the subsequent fragment (e.g., fragment 3.6 and fragment 11); the original fragment starts after the subsequent fragment and ends before the subsequent fragment (e.g., fragment 3.1 and fragment 6); and the original fragment starts after the subsequent fragment and ends the same as the subsequent fragment (e.g., fragment 3.2 and fragment 7).

Utilizing the model of FIG. 9, at least seven different fragment reassembly policies for example can be formulated: (1) BSD operating system favors an original fragment with an offset that is less than or equal to a subsequent fragment; (2) BSD-right operating system favors a subsequent fragment when the original fragment has an offset that is less than or equal to the subsequent offset, except when the original fragment ends at the same or greater offset than the subsequent fragment; in this case, BSD-right favors the original fragment; (3) LINUX operating system favors an original fragment with an offset that is less than a subsequent fragment; (4) First favors the original fragment with a given offset; (5) WINDOWS operating system favors the original fragment, except if a subsequent fragment offset begins before the original fragment and ends after the original fragment; in this case, WINDOWS operating system favors the subsequent fragment; (6) SOLARIS operating system favors the original fragment except if a subsequent fragment offset begins before the original fragment and ends at an offset equal to or greater than the original fragment; in this case, SOLARIS operating system favors the subsequent fragment; and (7) Last favors the subsequent fragment with a given offset. The "First" and "Last" reassembly policies are theoretical, since no available test system responded as expected.

Other reassembly policies can be formulated which take into consideration one or more of the comprehensively overlapped fragments. For example, a reassembly policy might call for ignoring comprehensively overlapping packets, which appears to be appropriate for current CISCO operating systems. As another example, a reassembly policy might call for honoring original or subsequent fragments differently when an original fragment starts after and ends before a subsequent fragment, depending on whether the original fragment does or does not directly abut a previous original fragment (left-anchored vs. non-left-anchored). In this case, WINDOWS honors a subsequent fragment over an original non-left-anchored fragment (i.e., fragments 6 and 3.1, respectively), but honors an original left-anchored fragment over a subsequent fragment (not illustrated). Various implementations can include a combination of any and/or all of the reassembly policies, where at least one of the policies has a different analysis for comprehensively overlapped fragments.

A reassembly policy utilized by a particular type of target system can be observed, for example, by using an ICMP echo request (or other echo back application) with a unique payload that, when reflected in the returned ICMP echo response, can determine the fragmentation reassembly policy. A specific reassembly policy can be validated through active or passive scanners.

Accordingly, one or more embodiments provide that the fragments can be one of non-overlapped, comprehensively overlapped, partially overlapped, and completely overlapped, and the at least one fragment reassembly policy indicates an order specific to at least comprehensively overlapped fragments.

Figure 10:
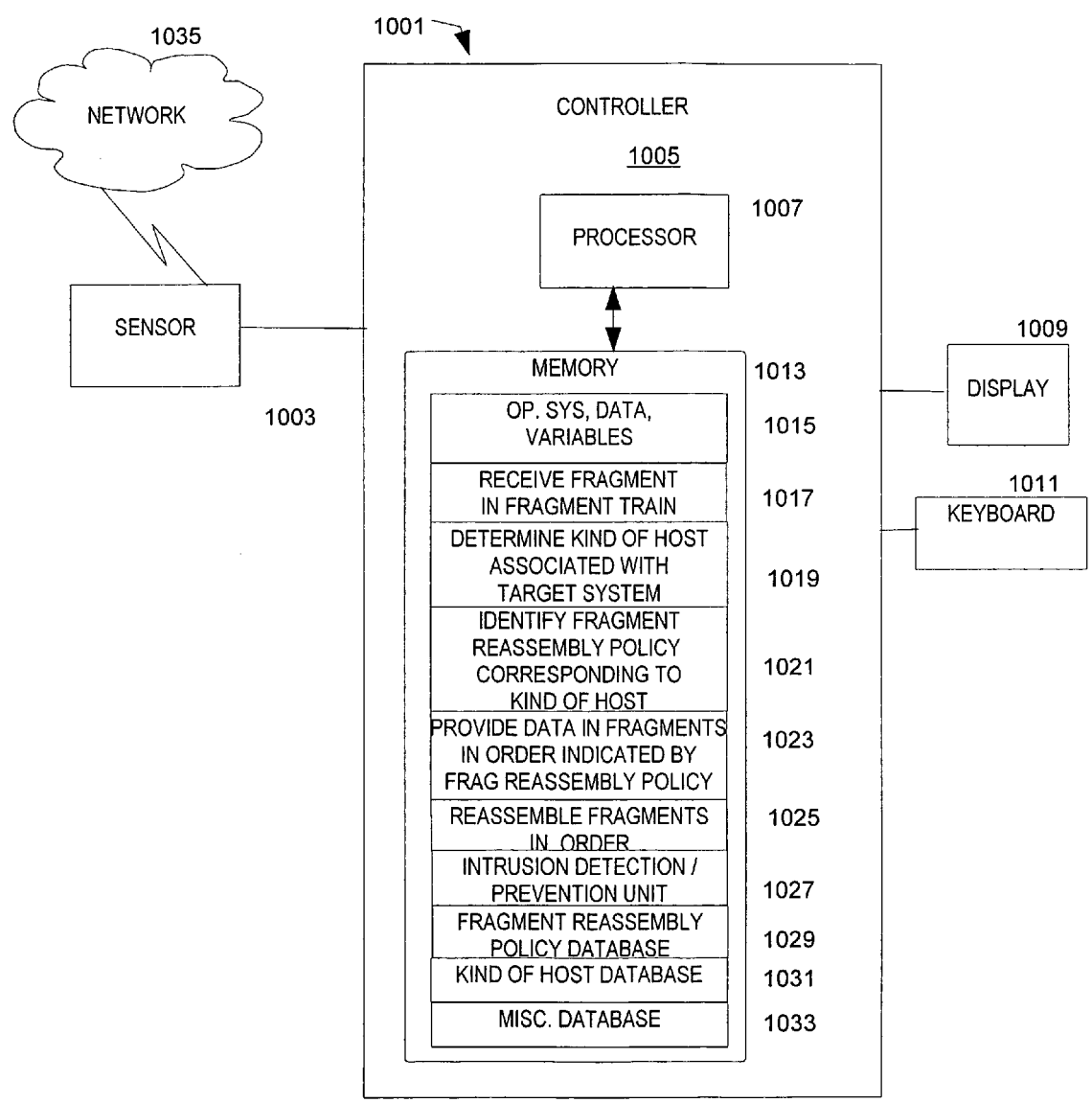
FIG. 10 is a block diagram illustrating portions of an exemplary computer system.

Referring to FIG. 10, a block diagram illustrating portions of an exemplary computer system 1001 will be discussed and described. The computer system 1001 may include one or more controllers 1005, which can receive signals from a sensor 1003 which senses communications from a network 1035 in accordance with known techniques, where the communications are being sent to a target system (not illustrated). The controller 1005 can include a processor 1007, a memory 1013, an optional display 1009, and/or an optional user input device such as a keyboard 1011.

The processor 1007 may comprise one or more microprocessors and/or one or more digital signal processors. The memory 1013 may be coupled to the processor 1007 and may comprise a read-only memory (ROM), a random-access memory (RAM), a programmable ROM (PROM), and/or an electrically erasable read-only memory (EEPROM). The memory 1013 may include multiple memory locations for storing, among other things, an operating system, data and variables 1015 for programs executed by the processor 1007; computer programs for causing the processor to operate in connection with various functions such as receiving 1017 fragments in a fragment train, determining 1019 a kind of host associated with the target system, identifying 1021 the fragment reassembly policy corresponding to the kind of host, providing 1023 data in the fragments in the order indicated by the fragment reassembly policy, reassembling 1025 the fragments in the order, an intrusion detection/prevention unit 1027, and/or other processing; a fragment reassembly policy database 1029; a kind of host database 1031; and a database 1033 for other information used by the processor 1007. The computer programs may be stored, for example, in ROM or PROM and may direct the processor 1007 in controlling the operation of the computer system 1001.

The processor 1007 optionally may be programmed for receiving 1017 fragments in a fragment train. In the illustrated example, fragments are detected by the sensor 1003 connected to the computer system 1001 and are supplied to the computer system 1001 in accordance with known techniques.

The processor 1007 may be programmed for determining 1019 a kind of host associated with the target system. In the typical situation, the target system is identified in the fragment, for example as the destination IP address. A kind of host database or table can be maintained for known target systems, which indicates the kind of host associated with a particular target system. The kind of host database or table can be created, for example by manual configuration or by querying certain target systems. Thus, the kind of host database or table can be referenced based on the target system identification to determine the associated kind of host. Alternatively, the fragment can include an indication of the kind of host. The kind of host indicates an operating system/platform and optionally a version, for example, HP JetDirect, AIX 2, FreeBSD, HP-UX B10.20, IRIX 4.0, NCD Thin Clients, OpenBSD, OpenVMS, OS/2, OSF1, SunOS 4.1.4, Tru64, LINUX 2.x, MAC OS, WINDOWS 2000, WINDOWS XP, CISCO IOS, etc. The kind of host is intended to distinguish between platforms and/or operating systems that reassemble fragments differently.

In addition, the processor 1007 may be programmed for identifying 1021 the fragment reassembly policy corresponding to the kind of host. Having determined the kind of host, an appropriate fragment reassembly policy can be determined. A particular fragment reassembly policy can be applied in connection with one or more kinds of host. Advantageously, a table or database can indicate one of several fragment reassembly policies to be applied for the particular kind of host. In the illustrated example, the fragment reassembly policy database 1029 includes two or more fragment reassembly policies, which can be indexed, for example by the kind of host.

Once the fragment reassembly policy is identified, the processor 1007 can provide 1023 data in the fragments in the order indicated by the fragment reassembly policy. The data can be provided, for example, by parsing the received fragments, by accumulating data from the fragments in storage in the order, or by data from the fragments being provided as input for another process (for example the intrusion detection/prevention unit 1027). For example, the processor 1007 can be programmed to handle the data in the fragments according to one or more of the policies and orders discussed in connection with FIG. 9, and/or FIG. 8.

Optionally, the processor 1007 may be programmed for specifically reassembling 1025 the fragments in the order. This can be done by storing the data from the fragments, in the order, in a storage location, to recreate the packet. The recreated packet can be provided for further processing, for example, to the intrusion detection/prevention unit 1027

The optional intrusion detection/prevention unit 1027 in the processor 1007 can be programmed in accordance with known techniques, to evaluate whether the fragments (in the proper order) suggest an attempted intrusion. The intrusion detection/prevention unit 1027 is illustrated as being incorporated into the computer system 1001; alternate embodiments can provide that some or all of the intrusion detection/prevention functions are in one or more different computer systems. Further, alternate embodiments provide that the intrusion detection/prevention unit 1027 is a host IDS or host IPS; thus the computer system can be the target system.

The processor 1007 may be programmed for a fragment reassembly policy database 1029. The fragment reassembly policy database 1029 can include two or more fragment reassembly policies. Alternatively, separate code can be provided for implementing the different fragment reassembly policies. The fragment reassembly policy database 1029 alternatively can be stored in a remote database and accessed as needed.

The processor 1007 may be programmed for a kind of host database 1031. The kind of host database 1031 can be maintained for known target systems, to indicate the kind of host associated with a particular target system. Optionally, the kind of host database 1031 can be maintained remotely, and relevant kind of host information can be downloaded as needed. Optionally, the kind of host can be indicated in a table rather than a database.

Accordingly one or more embodiments provide a computer system for at least one of detecting and preventing intrusion. The computer system can include (A) a unit configured to facilitate determining a kind of host associated with a target system, in response to an indication of the target system in fragments in a fragment train; (B) a fragment reassembly unit configured to facilitate identifying at least one fragment reassembly policy of plural fragment reassembly policies, the at least one fragment reassembly policy corresponding to the kind of host associated with the fragments in the fragment train; and (C) an order providing unit configured to facilitate providing data in the fragments in the fragment train in an order indicated by the at least one fragment reassembly policy.

One or more embodiments can include a reassembler to reassemble the fragments in the order indicated by the at least one fragment reassembly policy. Also, one or more embodiments can include an intrusion detection/prevention unit to detect/prevent an intrusion in the reassembled fragments, wherein the reassembler provides the reassembled fragments to the intrusion detection/prevention unit.

According to one or more embodiments, a receiving unit is configured to facilitate receiving fragments in the fragment train, wherein the fragments are received in accordance with an IP layer (discussed below). Moreover, according to one or more embodiments, the order providing unit further determines the order of the data in the fragments according to an IP layer format (discussed below). Furthermore, one or more embodiments can provide that the target system is indicated in a header of the fragments.

Also, accordingly to various embodiments, a plurality of target systems including the target system are provided, the target system being associated with a kind of host, respective kinds of host corresponding to respective fragment reassembly policies, and the at least one fragment reassembly policy which is identified corresponds to the kind of host associated with the target system.

It should be understood that various logical groupings of functions are described herein. Different realizations may omit one or more of these logical groupings. Likewise, in various realizations, functions may be grouped differently, combined, or augmented. Furthermore, functions including those identified as optional can be omitted from various realizations. Similarly, the present description may describe or suggest a database or collection of data and information. One or more embodiments can provide that the database or collection of data and information can be distributed, combined, or augmented, or provided locally (as illustrated) and/or remotely (not illustrated).

Figure 11:
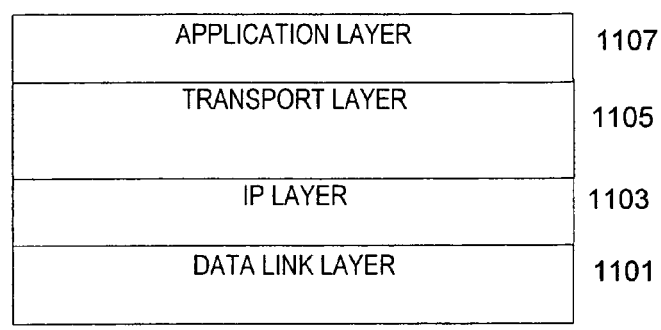
FIG. 11 is a block diagram illustrating IP layer processing.
Figure 12:
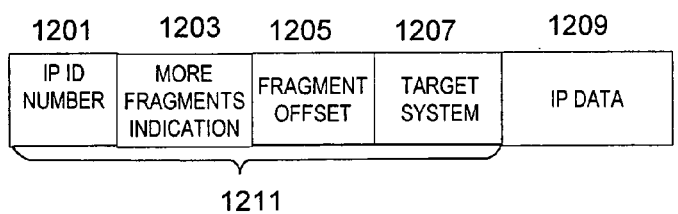
FIG. 12 is a block diagram illustrating portions of a fragment.

FIG. 11 and FIG. 12 illustrate relevant conventions associated with IP layer processing. FIG. 11 illustrates IP layer processing, and FIG. 12 illustrates relevant portions of a fragment in IP layer format.

Referring to FIG. 11, a block diagram illustrating IP layer processing will be discussed and described. This example illustrates a data link layer 1101, an IP layer 1103, a transport layer 1105, and an application layer 1107. A packet is received and processed in accordance with known means at the various layers. For example, an incoming packet is initially received at the data link layer; passed to the IP layer; and then sequentially passed to layers above for additional processing. Conventions associated with the data link layer 1101, the IP layer 1103, the transport layer 1105 and the application layer 1107, and the like are well known. In particular, conventions for formats of packets and of packet fragments in accordance with the IP layer are well known.

Referring to FIG. 12, a block diagram illustrating portions of a fragment will be discussed and described. The illustrated fragment is an IP fragment, that is, a fragment of a packet formatted according to the IP layer. The fragment includes a header 1211 and IP data 1209. The header 1211 includes an IP identification number 1201, a more fragments indication 1203, a fragment offset 1205, and an indication of the target system 1207.

When a packet is created in accordance with conventional IP layer processing, the packet is provided with the IP identification number 1201. When the IP packet is separated into fragments, each fragment still belongs to the original IP packet and conventionally includes the IP identification number 1201. A fragment train can be identified by fragments which have the same IP identification number.

The more fragments indication 1203 is inserted when the IP packet is split into fragments, in accordance with known techniques. If the more fragments indication 1203 is not set, that typically indicates that the fragment is the last fragment in the IP packet. The fragment offset 1205 is included in the packet to indicate the offset of the data in the original IP packet.

The target system 1207 uniquely identifies the destination for the IP packet. The target system 1207 conventionally is the destination system IP address.

Accordingly, one or more embodiments provide that the fragments are formatted according to an IP layer format. Moreover, one or more embodiments provide that the target system is indicated in a header of the fragments.

Figure 13:
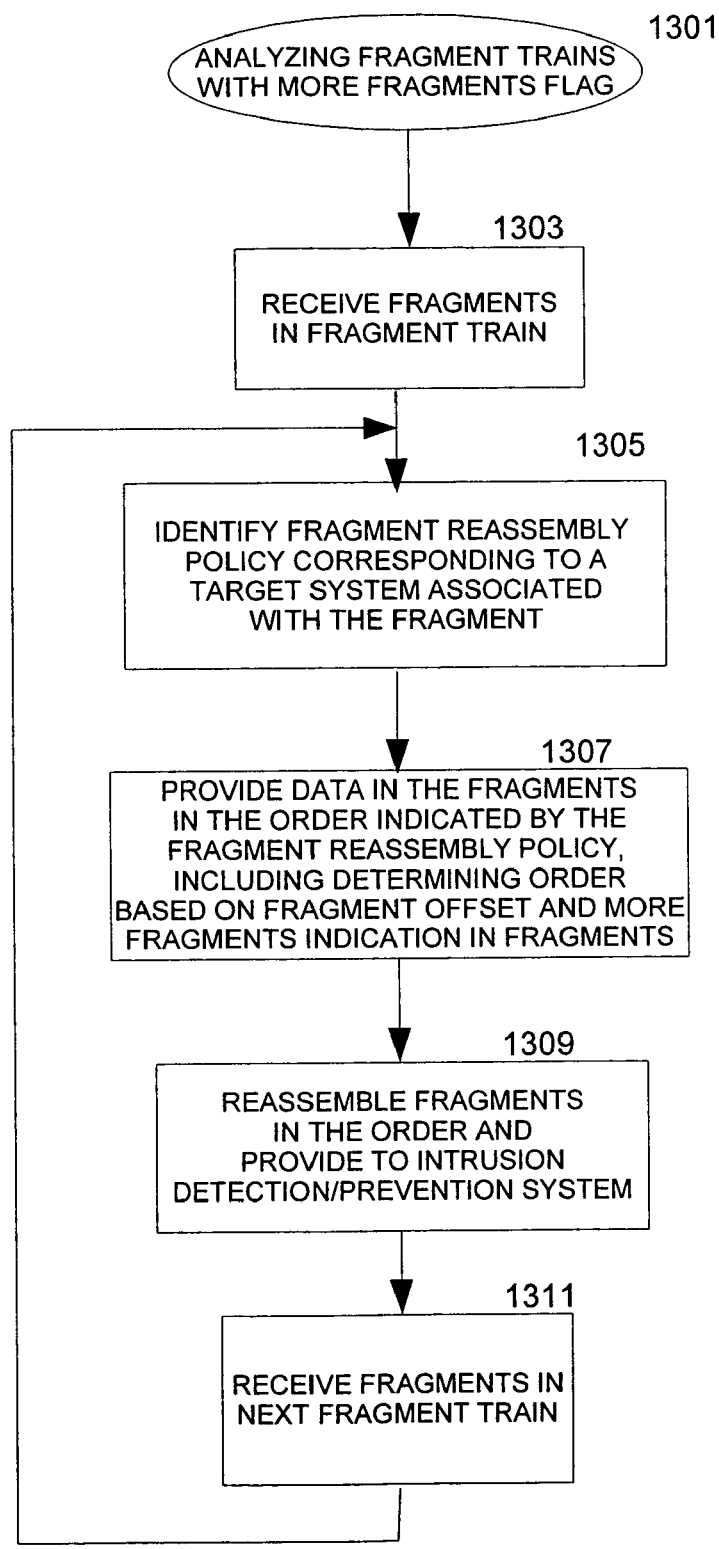
FIG. 13 is a flow chart illustrating an exemplary procedure for analyzing fragment trains with a more fragments flag.
Figure 14:
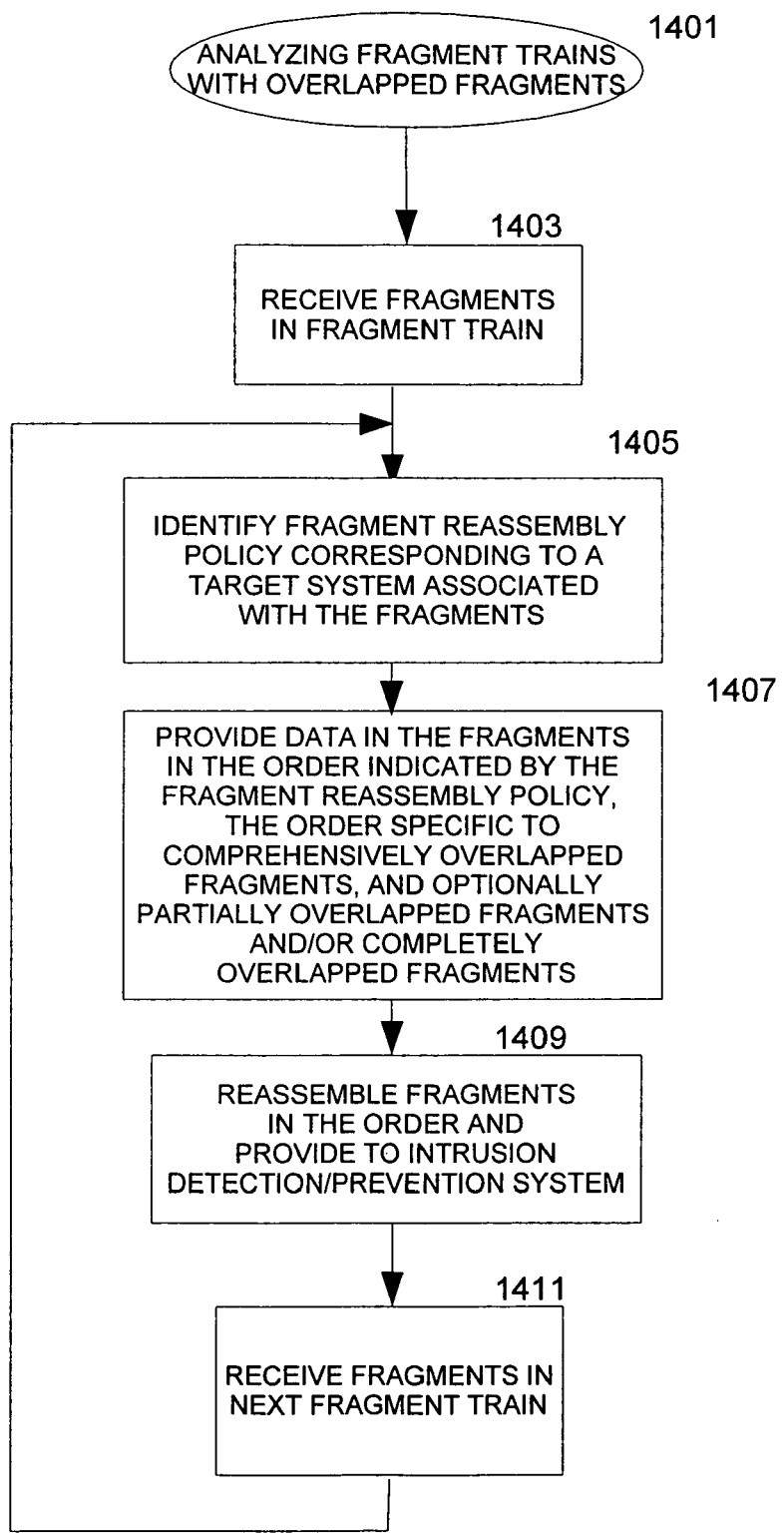
FIG. 14 is a flow chart illustrating an exemplary procedure for analyzing fragment trains with overlapped fragments.

FIG. 13 and FIG. 14 are flow charts of procedures for analyzing fragment trains. FIG. 13 specifically handles the more fragments indication, and FIG. 14 specifically handles comprehensively overlapped fragments. Although these are illustrated as separate procedures, it will be appreciated that a procedure can handle both the more fragments indication and the comprehensively overlapped fragments. These procedures can advantageously be implemented on, for example, a processor of a controller, described in connection with FIG. 10 or other apparatus appropriately arranged. FIGS. 13 and 14 are discussed in more detail below.

Referring to FIG. 13, a flow chart illustrating an exemplary procedure 1301 for analyzing fragment trains with a more fragments flag will be discussed and described. In overview, the procedure 1301 includes receiving 1303 fragments in a fragment train, identifying 1305 a fragment reassembly policy corresponding to a target system associated with the fragment, providing data 1307 in the fragments in the order according to the fragment reassembly policy including handling the more fragments indication, and receiving 1311 fragments in the next fragment train. Optionally, the procedure 1301 can include reassembling 1309 the fragments in the order and providing to an intrusion detection/prevention system. These are described below, however, details which have previously been described are omitted.

The procedure includes receiving 1303 fragments in a fragment train. The fragments can be received in accordance with known techniques. In addition to receiving fragments within a fragment train out of order, it is possible that fragments for different fragment trains can be received out of order. Multiple fragment trains optionally can be stored while being received, according to conventional technology. Because fragments and fragment trains are not necessarily received in order, it will be appreciated that the reception of fragments and the process for providing the data in the fragments and/or reassembling the fragments can be handled asynchronously.

When a fragment train is received, the procedure provides for identifying 1305 a fragment reassembly policy corresponding to a target system associated with the fragment. For example, the target system can be determined from the fragment header, the kind of host associated with the target system can be determined (as described above), and the fragment reassembly policy for the kind of host can be determined (as described above). Alternatively, the target system can be determined from the fragment header, and the fragment reassembly policy for the target system can be determined (as described above). As another alternative, the IP header can indicate the fragment reassembly policy.

Then, the procedure can include providing the data 1307 in the fragments in the fragment train in the order according to the fragment reassembly policy, where the fragment reassembly policy includes determining the order based on the fragment offset and the more fragments indication in the fragments. This has been described above in detail.

Optionally, the procedure 1301 can include reassembling 1309 the fragments in the order and providing to an intrusion detection/prevention system. Each of these is described above in detail.

Having handled a fragment train, the procedure can provide for receiving 1311 fragments in the next fragment train.

Accordingly, one or more embodiments provides a method for analyzing fragment trains in a communication network, a fragment train including a plurality of fragments in the same fragment train and associated with the same target system, comprising: (A) identifying at least one fragment reassembly policy of plural fragment reassembly policies, the at least one fragment reassembly policy corresponding to a target system associated with fragments in a fragment train; and (B) providing data in the fragments in the fragment train in an order indicated by the at least one fragment reassembly policy, the at least one fragment reassembly policy including determining the order responsive to an offset and a more fragments indication in the fragments.

Accordingly, one or more embodiments includes reassembling the fragments in the order indicated by the at least one fragment reassembly policy; and providing the reassembled fragments to an intrusion detection/prevention system.

Moreover, one or more embodiments provides for receiving the fragments in the fragment train, wherein the receiving is performed in accordance with an IP layer.

Referring to FIG. 14, a flow chart illustrating an exemplary procedure 1401 for analyzing fragment trains with overlapped fragments will be discussed and described. In overview, the procedure 1401 includes receiving 1403 fragments in a fragment train, identifying 1405 a fragment reassembly policy corresponding to a target system associated with the fragment, providing data 1407 in the fragments in the order according to the fragment reassembly policy including handling comprehensively overlapped fragments, and receiving 1411 fragments in the next fragment train. Optionally, the procedure 1401 can include reassembling 1409 the fragments in the order and providing them to an intrusion detection/prevention system. Details which have previously been described are omitted. Furthermore, much of FIG. 14 is similar to FIG. 13; to avoid repetition, reference is made back to FIG. 13 where appropriate.

The procedure includes receiving 1403 fragments in a fragment train, as described in connection with FIG. 13. When a fragment train is received, the procedure provides for identifying 1405 a fragment reassembly policy corresponding to a target system associated with the fragment, also as described in FIG. 13.

Then, the procedure can include providing the data 1407 in the fragments in the fragment train in the order according to the fragment reassembly policy, where the order is specific to comprehensively overlapped fragments. Optionally, the order can handle partially overlapped fragments and/or completely overlapped fragments. This has been described above in detail.

Optionally, the procedure 1401 can include reassembling 1409 the fragments in the order, and/or providing to an intrusion detection/prevention system. Each of these is described above in detail. Having handled a fragment train, the procedure can provide for receiving 1411 fragments in the next fragment train.

Accordingly, one or more embodiments provides for a computer-readable medium comprising instructions for execution by a computer, the instructions including a computer-implemented method for analyzing fragment trains in a communication network, a fragment train including a plurality of fragments in the same fragment train and associated with the same target system, where fragments can be non-overlapped, comprehensively overlapped, partially overlapped, or completely overlapped. The instructions are for implementing (A) identifying at least one fragment reassembly policy of plural fragment reassembly policies, the at least one fragment reassembly policy corresponding to a target system associated with fragments in a fragment train; and (B) providing data in the fragments in the fragment train in an order indicated by the at least one fragment reassembly policy, the at least one fragment reassembly policy indicating an order specific to at least comprehensively overlapped fragments. One or more embodiments further includes instructions for reassembling the fragments in the order indicated by the at least one fragment reassembly policy; and providing the reassembled fragments to an intrusion detection/prevention system. Furthermore, one or more embodiments includes instructions for receiving the fragments in the fragment train, wherein the receiving is performed in accordance with an IP layer, and the providing data in the fragments includes applying an IP layer format to the fragments. Optionally, one or more embodiments provides a plurality of target systems including the target system, the target system being associated with a kind of host, respective kinds of host being associated with respective fragment reassembly policies, and the at least one fragment reassembly policy which is identified is associated with the kind of host associated with the target system.

Moreover, embodiments include a computer system configured with the foregoing computer-readable medium and/or method(s); and/or a communication network comprising at least one computer system configured with the foregoing computer-readable medium and/or method(s).

It should be noted that the communication networks of interest include those that transmit information in packets which can be formed into fragments, for example, those known as packet switching networks that transmit data in the form of packets, where data can be divided into packets before transmission, the packets are transmitted, and the packets are routed over network infrastructure devices which can fragment the packets, which are sent to a destination where the fragments are reassembled into the packets. Such networks include, by way of example, the Internet, intranets, local area networks (LAN), wireless LANs (WLAN), wide area networks (WAN), and others. Protocols supporting communication networks that utilize packets include one or more of various networking protocols having any link layers that support IP, or any application or transport that rides over IP, for example TCP/IP (Transmission Control Protocol/Internet Protocol), HTTP (hypertext transfer protocol), and other wireless application protocols or wireline application protocols and/or other protocol structures, and variants and evolutions thereof. Such networks can provide wireless communications capability and/or utilize wireline connections such as cable and/or a connector, or similar.

Furthermore, the designation "intrusion detection/prevention system" is used herein to denote a device or software that passively or actively analyzes network traffic for intrusion. Examples of such devices or software are sometimes referred to as "intrusion detection system" (IDS), "intrusion prevention system" (IPS), "network intrusion detection system" (NIDS), "network intrusion protection system" (NIPS"), and the like, and variants or evolutions thereof. An intrusion detection/prevention system may be host-based, or may monitor traffic to a target system using, for example, sensors, anywhere between the target system and the intruder, typically after a final router or firewall. The designation "intrusion detection/prevention" is used herein to indicate the analysis of network traffic with respect to intrusion, whether the analysis is used passively (commonly referred to as "intrusion detection") or actively (commonly referred to as "intrusion prevention"). Likewise, the designation "detect/prevent" is utilized to indicate either passive or active handling of intrusion, which may occur for example in an IDS, an IPS, or other software or device which incorporates an IDS or IPS function.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for analyzing fragment trains in a communication network, a fragment train including a plurality of fragments in the same fragment train and associated with a target system, comprising:
   determining, in an intrusion detection/prevention system, which kind of host is associated with the target system identified in a header of the fragments in the fragment train;
   reassembling, in the intrusion detection/prevention system, data in the fragments in the fragment train in an order indicated by a fragment reassembly policy selected from plural different fragment reassembly policies corresponding to different kinds of hosts based on the determined kind of host for the target system identified in the fragments in the fragment train,
   the fragment reassembly policy indicating an order specific to the fragment offset field and the more fragments flag in the fragments,
   when the fragment includes the more fragments flag indication, the order of the data indicated by the fragment reassembly policy is different from the order of the data when in fragments which do not include the more fragments flag indication,
   the data in fragments which include the more fragments flag indication and a same fragment offset further being reassembled in a different order in the different fragment reassembly policies.

2. The method according to claim 1, further comprising:
   providing the reassembled fragments to the intrusion detection/prevention system.

3. The method according to claim 1, further comprising receiving the fragments in the fragment train, wherein the receiving is performed in accordance with an IP layer.

4. The method according to claim 1, the fragments being formatted according to an IP layer format, the target system identified in the header being a destination system IP address, the fragments having a same IP identification number in the header being handled as belong to the same fragment train.

5. The method according to claim 1, wherein
   a plurality of different target systems including the target system are provided, the different target systems being associated with different kinds of hosts, respective kinds of hosts being associated with respective fragment reassembly policies.

6. The method according to claim 1,
   the fragment reassembly policies further indicating an order specific to comprehensively overlapped fragments,
   when the data is in the comprehensively overlapped fragments, the order of the data indicated by the fragment reassembly policy is different from the order of the data when in fragments which are not comprehensively overlapped,
   the data in comprehensively overlapped fragments further being reassembled in a different order in the different fragment reassembly policies.

7. A computer-readable non-transitory storage medium comprising instructions for execution by a computer, the instructions including a computer-implemented method for analyzing fragment trains in a communication network, a fragment train including a plurality of fragments in the same fragment train and associated with the same target system, where fragments can be non-overlapped, comprehensively overlapped, partially overlapped, or completely overlapped, the instructions for implementing:
   determining which kind of host is associated with a target system identified in a header of the fragments in the fragment train in response to receiving the fragments; and
   reassembling data in the fragments in the fragment train in an order indicated by a fragment reassembly policy selected from plural different fragment reassembly policies corresponding to different kinds of hosts based on the determined kind of host for the target system identified in the fragments in the fragment train,
   the fragment reassembly policy indicating an order specific to comprehensively overlapped fragments,
   when the data is in the comprehensively overlapped fragments, the order of the data indicated by the fragment reassembly policy is different from the order of the data when in fragments which are not comprehensively overlapped,
   the data in comprehensively overlapped fragments further being reassembled in a different order in the different fragment reassembly policies.

8. The computer-readable storage medium according to claim 7, the instructions further comprising:
   providing the reassembled fragments to an intrusion detection/prevention system.

9. The computer-readable storage medium according to claim 7, the instructions further comprising receiving the fragments in the fragment train, wherein
   the receiving is performed in accordance with an IP layer.

10. The computer-readable storage medium according to claim 7, wherein
    a plurality of different target systems including the target system are provided, the different target systems being associated with different kinds of hosts, respective kinds of hosts being associated with respective fragment reassembly policies.

11. A computer system configured to execute all of the instructions of the computer-readable storage medium of claim 7.

12. A communication network comprising at least one computer system configured to execute all of the instructions of the computer-readable medium of claim 7.

13. A computer system for at least one of detecting and preventing intrusion, comprising: a unit configured to facilitate determining which kind of host is associated with a target system identified in a header of a plurality of fragments in a fragment train identified as belonging in a same IP packet, in response to all indication of the target system in fragments in the fragment train; a fragment reassembly unit configured to facilitate reassembling data in the fragments in the fragment train in an order indicated by a fragment reassembly policy selected from plural different fragment reassembly policies corresponding to different kinds of hosts based on the determined kind of host for the target system identified in the fragments in the fragment train, the data in the fragments belonging in the same IP packet being reassembled by the fragment reassembly unit in a different order in the different fragment reassembly policies; the fragment reassembly policies indicating an order specific to comprehensively overlapped fragments; when the data is in comprehensively overlapped fragments, the order of the data indicated by the fragment reassembly policy is different from the order of the data when in fragments which are not comprehensively overlapped, the data in comprehensively overlapped fragments further being reassembled in a different order in the different fragment reassembly policies.

14. The computer system according to claim 13, further comprising a reassembler to reassemble the fragments in the order indicated by the fragment reassembly policy.

15. The computer system according to claim 14, further comprising an intrusion detection/prevention unit to detect/prevent an intrusion in the reassembled fragments, wherein
the reassembler provides the reassembled fragments to the intrusion detection/prevention unit.

16. The computer system according to claim 13, further comprising a receiving unit configured to facilitate receiving fragments in the fragment train, wherein
the fragments are received in accordance with an IP layer.

17. The computer system according to claim 13, wherein the fragment reassembly unit further determines the order of the data in the fragments according to an IP layer format.

18. The computer system according to claim 13, wherein
a plurality of target systems including the target system are provided, the target system being associated with a kind of host, respective kinds of host corresponding to respective fragment reassembly policies, and
the fragment reassembly policy which is identified corresponds to the kind of host associated with the target system.

19. The computer system according to claim 13, the fragment reassembly policies indicating an order of the fragments specific to a more fragments flag and a fragment offset field in the header of the fragment,
when the fragment includes the more fragments flag indication, the order of the data indicated by the fragment reassembly policy is different from the order of the data when in fragments which do not include the more fragments flag indication,
the data in fragments which include the more fragments flag indication and a same fragment offset further being reassembled in a different order in the different fragment reassembly policies.

20. The computer system according to claim 13,
the fragment reassembly policies indicating an order specific to comprehensively overlapped fragments, and specific to a more fragments flag and a fragment offset field in the header of the fragment,
when the data is in comprehensively overlapped fragments, the order of the data indicated by the fragment reassembly policy is different from the order of the data when in fragments which are not comprehensively overlapped,
the data in comprehensively overlapped fragments further being reassembled in a different order in the different fragment reassembly policies,
when the fragment includes the more fragments flag indication, the order of the data indicated by the fragment reassembly policy is different from the order of the data when in fragments which do not include the more fragments flag indication,
the data in fragments which include the more fragments flag indication and a same fragment offset further being reassembled in a different order in the different fragment reassembly policies.

21. The computer readable medium according to claim 7, the fragment reassembly policies calling for honoring the fragment differently depending on whether or not the fragment is left-anchored,
when the fragment is left-anchored, the order of the data in the fragments as indicated by the fragment reassembly policy is different from the order of the data when in fragments which are not left-anchored,
the data in fragments which are left-anchored further being reassembled in a different order in the different fragment reassembly policies,
the fragment being deemed as left-anchored only when the fragment directly abuts a previous original fragment.

* * * * *